(12) United States Patent
Lin et al.

(10) Patent No.: US 10,955,703 B2
(45) Date of Patent: Mar. 23, 2021

(54) QUANTUM-DOT EMBEDDED POLARIZER COMPONENT AND DISPLAY DEVICE USING SAME

(71) Applicant: A. U. VISTA, INC., Milpitas, CA (US)

(72) Inventors: Yi-Wen Lin, Hsin-Chu (TW); Adiel Abileah, Milpitas, CA (US); Willem Den Boer, Milpitas, CA (US); Fang-Chen Luo, Milpitas, CA (US); Shu-Han Wang, Hsin-Chu (TW); Chih-Kang Wu, Hsin-Chu (TW)

(73) Assignee: A.U. VISTA, INC., Milpitas, CA (US)

( * ) Notice: Subject to any disclaimer, the term of this patent is extended or adjusted under 35 U.S.C. 154(b) by 0 days.

(21) Appl. No.: 16/504,878

(22) Filed: Jul. 8, 2019

(65) Prior Publication Data

US 2019/0331966 A1    Oct. 31, 2019

Related U.S. Application Data

(63) Continuation of application No. 14/947,430, filed on Nov. 20, 2015, now abandoned.

(51) Int. Cl.
| | | |
|---|---|---|
| *G02F 1/13357* | (2006.01) | |
| *G02F 1/1335* | (2006.01) | |
| *G02B 5/30* | (2006.01) | |
| *G02B 5/20* | (2006.01) | |
| *G02B 27/28* | (2006.01) | |

(52) U.S. Cl.
CPC ......... *G02F 1/133617* (2013.01); *G02B 5/30* (2013.01); *G02F 1/13362* (2013.01); *G02F 1/133528* (2013.01); *G02F 1/133621* (2013.01); *G02B 5/201* (2013.01); *G02B 27/283* (2013.01); *G02F 2001/133614* (2013.01); *G02F 2202/36* (2013.01)

(58) Field of Classification Search
CPC ........... G02F 1/133617; G02F 1/13362; G02F 1/133528; G02F 1/133621; G02F 2001/133614; G02F 2202/36; G02B 5/30; G02B 5/201; G02B 27/283
USPC ...................................... 349/96–98
See application file for complete search history.

(56) References Cited

U.S. PATENT DOCUMENTS

| | | |
|---|---|---|
| 6,956,631 B2 | 10/2005 | Wu et al. |
| 6,976,781 B2 | 12/2005 | Chu et al. |

(Continued)

FOREIGN PATENT DOCUMENTS

| | | |
|---|---|---|
| CN | 102854558 | 1/2013 |

*Primary Examiner* — Charles S Chang
(74) *Attorney, Agent, or Firm* — Ware, Fressola, Maguire & Barber LLP

(57) ABSTRACT

A polarizer component has an optical film to receive excitation light, a light re-emitting layer and a polarizing layer. The light re-emitting layer has quantum dots that re-emit red light and quantum dots that re-emit green light in response to the excitation light. The re-emitted red light is provided to a red sub-pixel to be filtered by a red color filter, and the re-emitting green light is provided to a green sub-pixel to be filtered by a green color filter. The excitation light can be blue or ultra violet and part of the excitation light is provided to a blue sub-pixel. The polarizing layer can be a reflective polarizing layer and the optical film can be a wavelength selecting layer. The light re-emitting layer may contain scattering particles to diffuse the excitation light provided to a blue sub-pixel.

17 Claims, 13 Drawing Sheets

(56) References Cited

U.S. PATENT DOCUMENTS

| | | |
|---|---|---|
| 7,101,069 B2 | 9/2006 | Yu et al. |
| 8,593,590 B2 | 11/2013 | Jung |
| 2012/0154464 A1 | 6/2012 | Ninan et al. |
| 2014/0078716 A1 | 3/2014 | Ninan et al. |
| 2014/0118988 A1* | 5/2014 | Aoki .................... G02B 5/3083 362/19 |
| 2014/0204128 A1 | 7/2014 | Jiang |
| 2015/0062490 A1 | 3/2015 | Kwon |
| 2015/0176775 A1* | 6/2015 | Gu .................... G02F 1/133617 349/42 |
| 2015/0228232 A1 | 8/2015 | Lee et al. |
| 2016/0116801 A1* | 4/2016 | Fan .................. G02F 1/133617 349/71 |
| 2016/0377263 A1 | 12/2016 | Lee |

\* cited by examiner

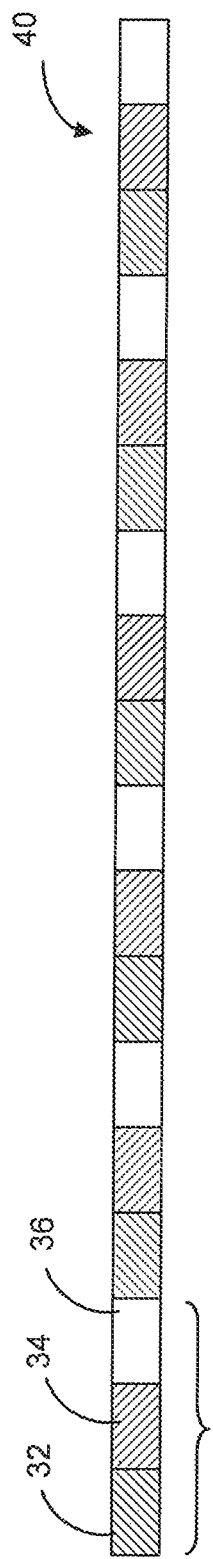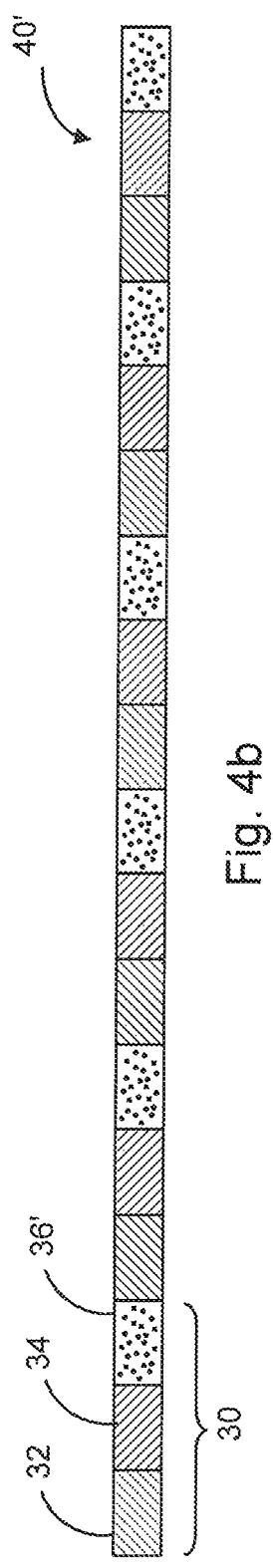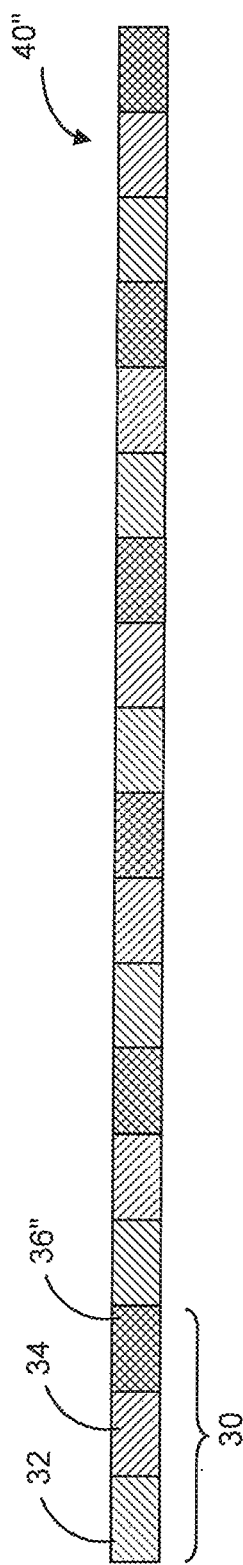

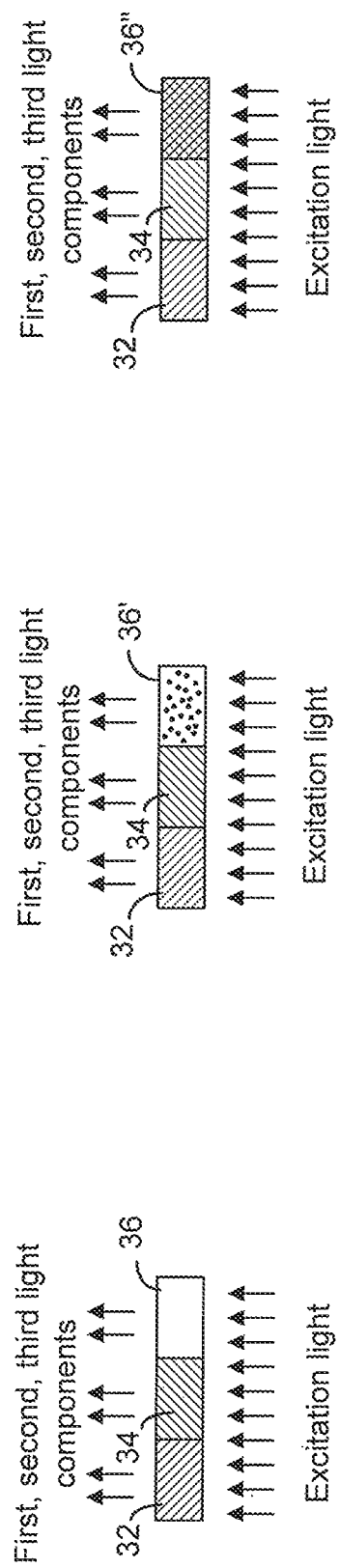

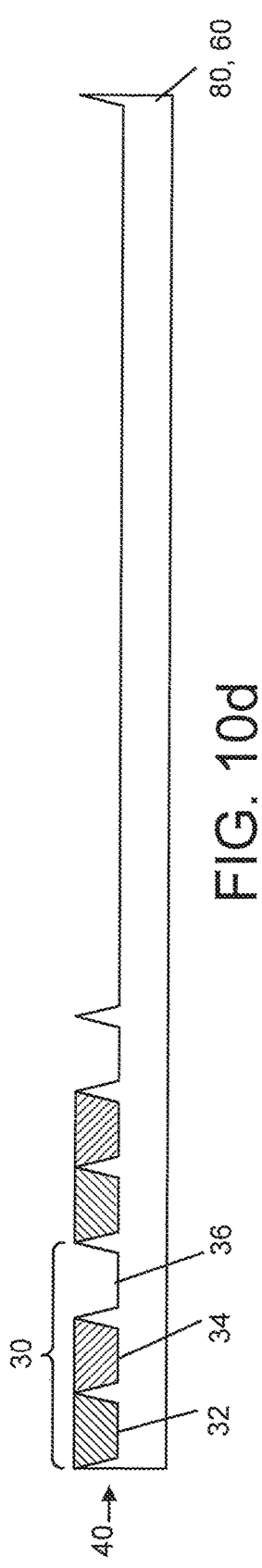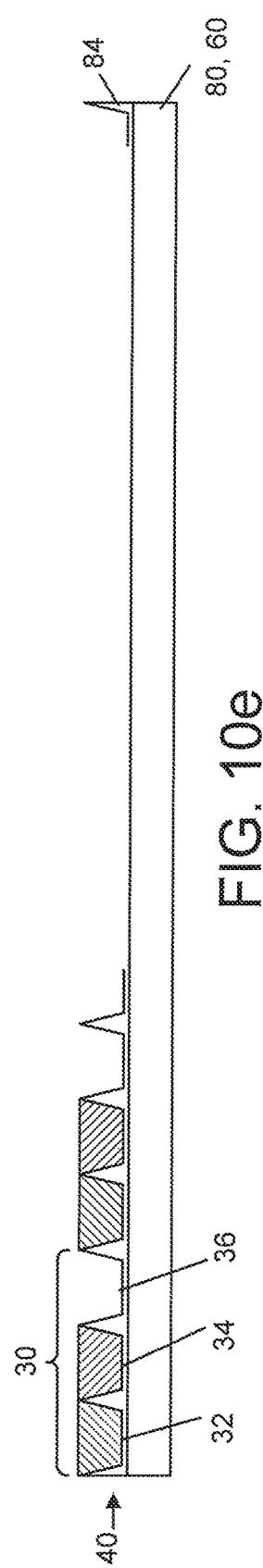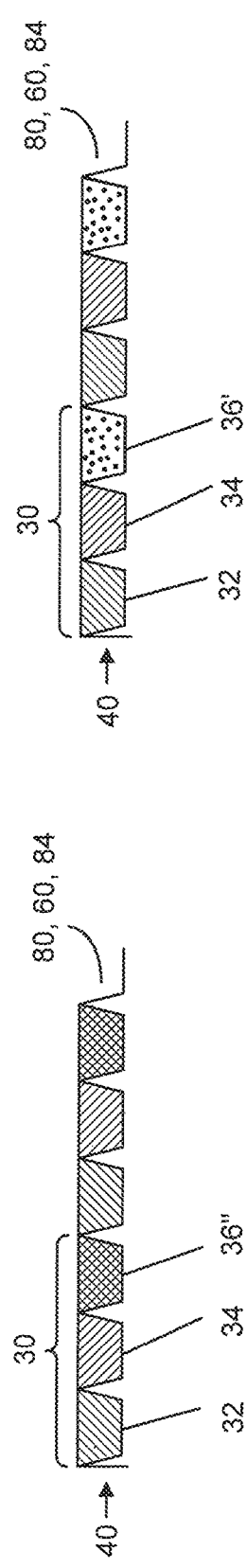

QUANTUM-DOT EMBEDDED POLARIZER COMPONENT AND DISPLAY DEVICE USING SAME

CROSS-REFERENCE TO RELATED APPLICATIONS

This is a continuation application of and claims priority to U.S. patent application Ser. No. 14/497,430, filed on Nov. 20, 2015, the entire content of which is hereby incorporated by reference.

TECHNICAL FIELD

The present invention relates generally to a color display and, in particular, to a liquid crystal display.

BACKGROUND OF THE INVENTION

Liquid crystal displays (LCD) are widely used in electronic devices, such as laptops, smart phones, digital cameras, billboard-type displays, and high-definition televisions. LCD panels may be configured as disclosed, for example, in Wu et al., U.S. Pat. No. 6,956,631, which is assigned to AU Optronics Corp., the parent company of the assignee of the current application, and hereby incorporated by reference in its entirety. As disclosed in Wu et al. FIG. 1, the LCD panel may comprise a top polarizer, a lower polarizer, a liquid crystal cell, and a backlight. Light from the backlight passes through the lower polarizer, through the liquid crystal cell, and then through the top polarizer. As further disclosed in Wu et al. FIG. 1, the liquid crystal cell may comprise a lower glass substrate and an upper substrate containing color filters. A plurality of pixels comprising thin film transistor (TFT) devices may be formed in an array on the lower glass substrate, and a liquid crystal compound may be filled into the space between the lower glass substrate and the color filter forming a layer of liquid crystal material. A hardening protective layer may be placed on the top polarizer and it may be advantageous to apply the anti-glaring treatment to the lower polarizer.

The LCD backlight unit may be configured as a direct-type backlight, as disclosed for example in Yu et al., U.S. Pat. No. 7,101,069, which is assigned to AU Optronics Corp., the parent company of the assignee of the current application, and hereby incorporated by reference in its entirety. As disclosed in Yu et al. FIG. 3, the backlight unit may comprise a diffuser, with one or more diffusing plates and/or prisms disposed on the diffuser. A reflecting plate may be disposed under the diffuser, with one or more illumination tubes as the light source disposed between the diffuser and the reflecting plate.

The LCD backlight unit may also be configured as an edge-type backlight, as disclosed for example in Chu et al., U.S. Pat. No. 6,976,781, which is assigned to AU Optronics Corp., the parent company of the assignee of the current application, and hereby incorporated by reference in its entirety. As disclosed in Chu et al., FIG. 4, the backlight unit may comprise a tubular lamp and a light guide plate as the light sources and also a bezel which may have a rectangular board. Reflector sheet, the light guide panel and one or more optical films may be disposed in sequence on the rectangular board. A frame may be mounted on the bezel to contain these components.

In general, each pixel has at least three color sub-pixels. Red, green and blue color filters are used in the respective color sub-pixels to form a color image on the display screen. The red, green and blue color filters separate the white light provided by the backlight unit into red, green and blue light components. Each of the red, green and blue color filters transmits only light of a narrow wavelength range and absorbs the rest of the visible spectrum. As such, the optical loss is significant. In most cases, the optical loss can be 70 percent.

Reducing the optical loss is, therefore, an important issue in the color display technology.

SUMMARY OF THE INVENTION

The present invention is directed to a quantum-dot embedded polarizer that can increase the brightness of the display panel and achieve the high color gamut solution with high efficiency. Through integrating quantum dots with polarizing film, the heat generated by the light source can be avoided and the efficiency of quantum dots can be increased. A wavelength selecting layer is applied beneath the quantum dot layer so that most of the red light generated from red quantum dots pass through the red color filter and most of the green light generated from green quantum dots pass through the green color filter. The blue light generated from blue backlight or blue quantum dots can be recycled inside the backlight module. Also a reflective polarizing layer made upon the quantum dot layer can increase the brightness by reflect the light that is normally absorbed by a bottom polarizer.

Thus, the first aspect of the present invention is a polarizer component, which comprises: a polarizing layer; an optical film configured to receive an excitation light; and a light re-emitting layer disposed between the polarizing layer and the optical film, wherein the light re-emitting layer comprises a plurality of light re-emitting cells, each cell comprising at least a first sub-cell, a second sub-cell and a third sub-cell, the first sub-cell comprising a first light re-emitting material configured to emit a first light component in a first wave-length range in response to the excitation light, the second sub-cell comprising a second light re-emitting material configured to emit a second light component in a second wave-length range in response to the excitation light, the third sub-cell configured to provide a third light component in response to the excitation light, wherein the first re-emitting material comprises a first quantum dot material arranged to emit the first light component, the second re-emitting material comprises a second quantum dot material arranged to emit the second light component, and wherein the first wavelength range is in the 600-680 nm range; the second wavelength range is in the 515-550 nm range; and the excitation light and the third light component comprise a third wavelength range in the 440-460 nm range, and wherein the optical film and the light re-emitting layer are arranged such that the excitation light is provided to the light re-emitting layer through the optical film, and wherein the optical film comprises a wavelength selecting layer configured to reflect light in the first wavelength range and light in the second wavelength range and to transmit light in the third wavelength range.

According to an embodiment of the present invention, the third sub-cell comprising a third light re-emitting material, the third light re-emitting material comprising a third quantum dot material configured to emit the third light component in a fourth wavelength range in response to the excitation light in an ultra-violet wavelength range from 290 to 400 nm, and the fourth wavelength range is in the 440-460 nm range.

According to an embodiment of the present invention, the polarizing layer configured to transmit light in a first polarization and to reflect light in a different second polarization.

According to an embodiment of the present invention, the polarizing layer is configured to transmit light in a first polarization and to partially reflect light in a different second polarization and to partially absorb light in the second polarization.

According to an embodiment of the present invention, the polarizing layer comprises a first polarizing sub-layer configured to transmit light in a first polarization and to reflect light in a second polarization different from the first polarization, and a second polarizing sub-layer configured to transmit light in the first polarization and to absorb light in the second polarization.

According to an embodiment of the present invention, the first polarizing sub-layer is provided between the second polarizing sub-layer and the light re-emitting layer.

The second aspect of the present invention is a display device, which comprises:

a display panel having a first side and an opposing second side;

a light source;

a polarizing component as described above disposed between the first side of the display panel and the light source; and a second polarizing component located on the second side of the display panel, wherein the light source is arranged to provide the excitation light.

According to an embodiment of the present invention, the display further comprises a reflective surface positioned in relationship to the light source, arranged to reflect at least part of the excitation light through the light source toward the polarizer component.

According to an embodiment of the present invention, the display panel comprises a first substrate on the first side, a second substrate on the second side and a liquid crystal layer disposed between the first substrate and the second substrate, wherein the polarizing layer of the polarizer component is disposed adjacent to the first substrate of the display panel, the display panel comprising a plurality of pixels, each pixel arranged to receive light from a light re-emitting cell in the light re-emitting layer, each pixel comprising at least a first color sub-pixel, a second color sub-pixel and a third color sub-pixel, and wherein the first sub-cell in said light re-emitting cell is arranged to provide the first light component to the first color sub-pixel, the second sub-cell in said light re-emitting cell is arranged to provide the second light component to the second color-sub-pixel, and the third sub-cell in said light re-emitting cell is arranged to provide the third light component to the third color sub-pixel.

According to an embodiment of the present invention, the display panel further comprises a color filter layer associated with the plurality of pixels, the color filter layer arranged to provide a first filter element configured to filter the first light component provided to the first color sub-pixel, a second filter element configured to filter the second light component provided to the second color sub-pixel, and a third filter element configured to filter the third light component provided to the third color sub-pixel, wherein the first filter element is a red filter, the second filter element is a green filter and the third filter element is a blue filter.

According to an embodiment of the present invention, the color filter layer is disposed on the first substrate of the display panel, between the liquid crystal layer and the first substrate.

According to an embodiment of the present invention, the color filter layer is disposed on the second substrate of the display panel, between the liquid crystal layer and the second substrate.

The third aspect of the present invention is a method for producing a polarizer component as described above, the method comprising:

providing a surface for the light re-emitting layer; and depositing the first light re-emitting material in the position of the first sub-cell and depositing the second light re-emitting material in the position of the second sub-cell.

According to an embodiment of the present invention, either the surface of the polarizing layer or the surface of the optical film provides the surface for the light re-emitting layer.

According to an embodiment of the present invention, the method further comprises:

depositing a third quantum dot material in the position of the third sub-cell, the third quantum dot material configured to emit the third light component in a 440-460 nm wavelength range in response to the excitation light which is in the ultra-violet wavelength range.

According to an embodiment of the present invention, the method further comprises depositing a scattering material in the position of the third sub-cell.

According to an embodiment of the present invention, the depositing comprises causing one or more nozzles to dispense droplets containing the first light re-emitting material in the position of the first sub-cell and to dispense droplets containing the second light re-emitting material in the position of the second sub-cell.

According to an embodiment of the present invention, the depositing further comprises causing one or more nozzles to dispense droplets containing the third light re-emitting material or a scattering material in the position of the third sub-cell.

According to an embodiment of the present invention, the optical film comprises a polymer layer, and the method further comprises modifying the polymer layer to provide indents thereon, the indents comprising a first indent in the position of the first sub-cells; a second indent in the position of the second sub-cells and a third indent in the position of the third sub-cells, the first indent arranged to receive the first light re-emitting material, the second indent arranged to receive the second light re-emitting material, and the third indent arranged to receive the third light re-emitting material or a light scatting material.

BRIEF DESCRIPTION OF THE DRAWINGS

FIG. 4a illustrates a light re-emitting layer, according to one embodiment of the present invention.

FIG. 4b illustrates a light re-emitting layer, according to another embodiment of the present invention.

FIG. 4c illustrates a light re-emitting layer, according to yet another embodiment of the present invention.

FIG. 4d illustrates the emerging of the first, second and third light components from a light re-emitting cell in the light re-emitting layer as shown in FIG. 4a in response to an excitation light.

FIG. 4e illustrates the emerging of the first, second and third light components from a light re-emitting cell in the light re-emitting layer as shown in FIG. 4b in response to an excitation light.

FIG. 4f illustrates the emerging of the first, second and third light components from a light re-emitting cell in the light re-emitting layer as shown in FIG. 4c in response to an excitation light.

FIG. 10d illustrates a method for producing a polarizer component, according to a different embodiment of the present invention.

FIG. 10e illustrates a method for producing a polarizer component, according to a further embodiment of the present invention.

FIG. 10f illustrates a method for producing a polarizer component, partly based on the embodiment as shown in FIGS. 10d and 10e.

FIG. 10g illustrates a different method for producing a polarizer component also partly based on the embodiment as shown in FIGS. 10d and 10e.

DETAILED DESCRIPTION OF THE INVENTION

Figure 1:
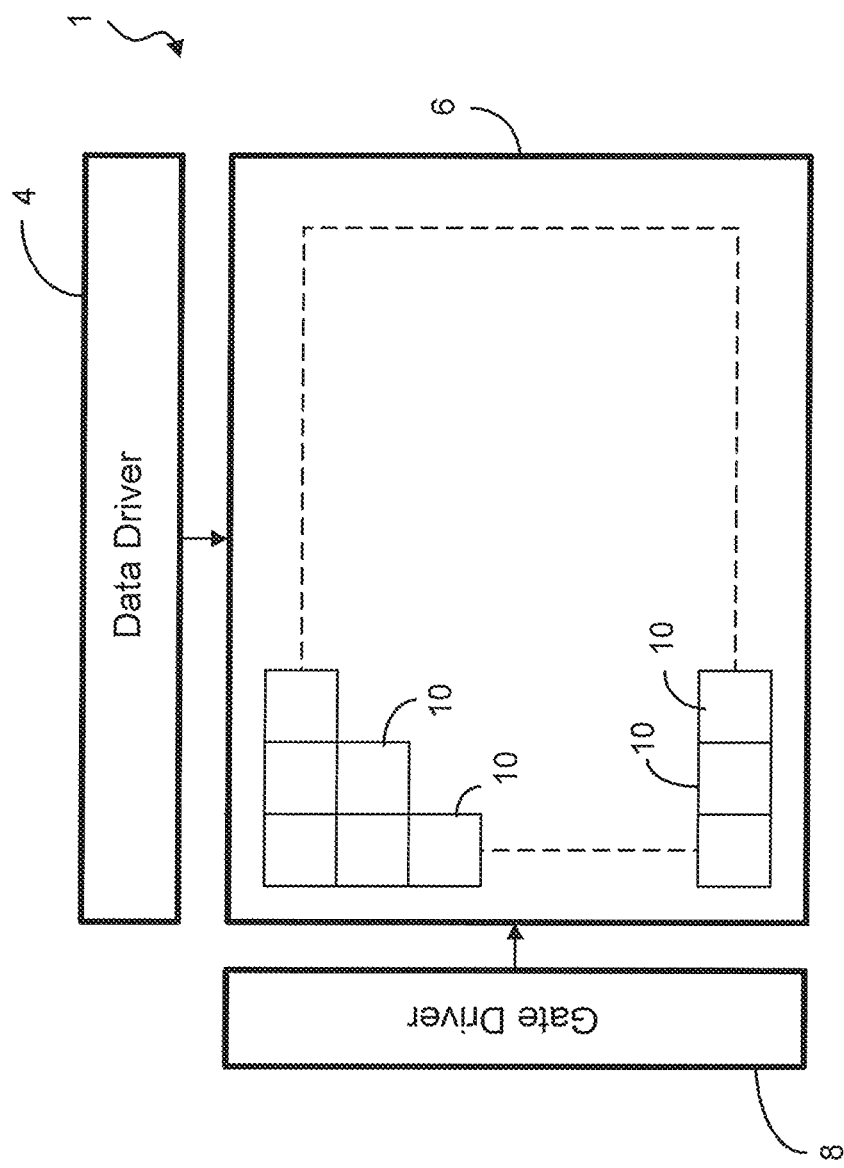
FIG. 1 illustrates a typical display device.
Figure 2:
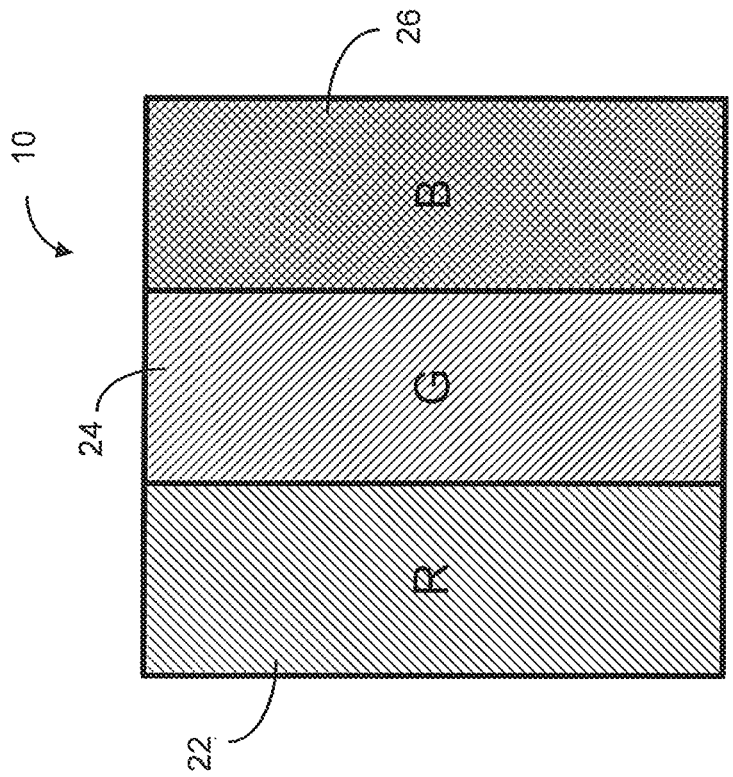
FIG. 2 illustrates a color pixel in a typical display device.
Figure 8A:
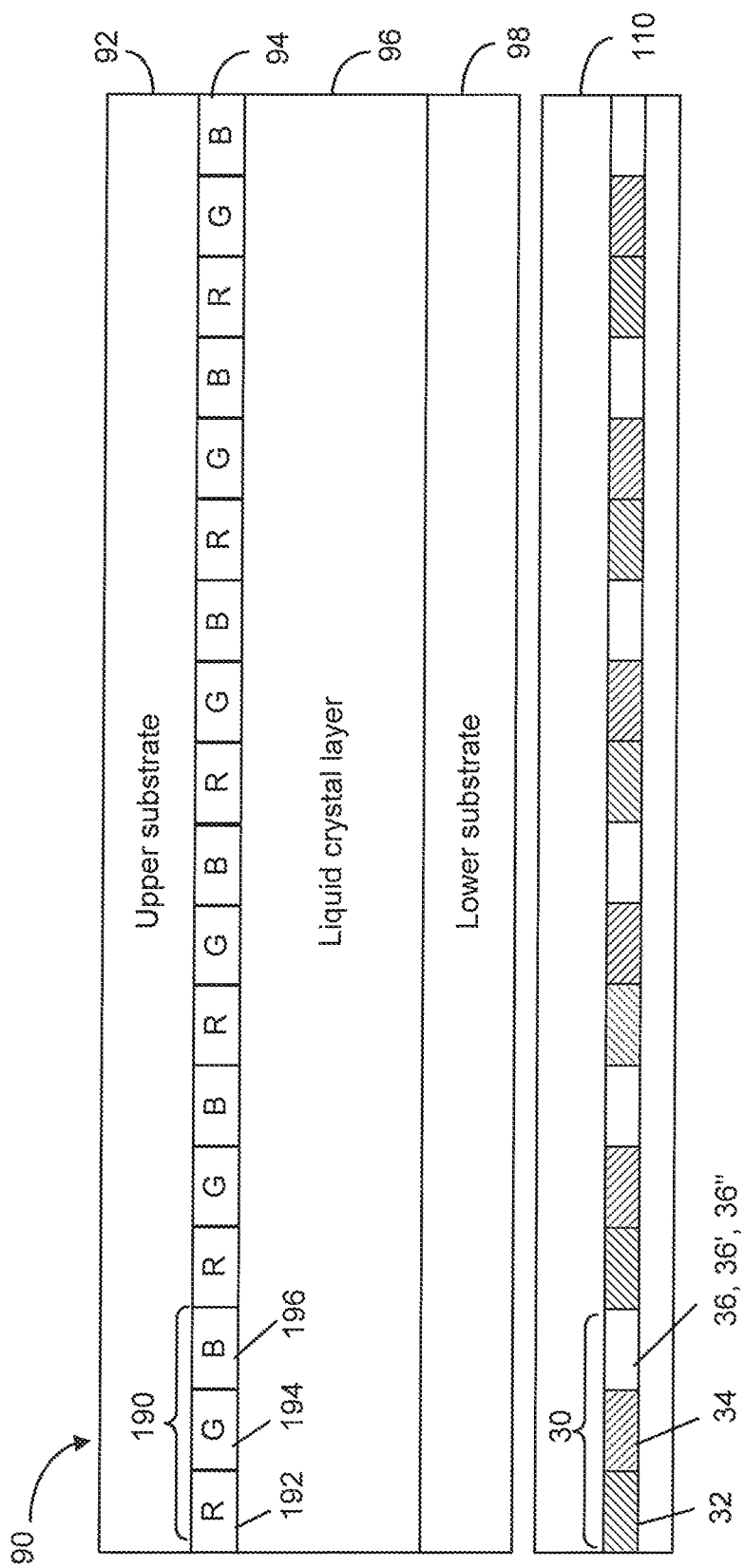
FIG. 8a illustrates a display panel, according to one embodiment of the present invention.
Figure 8B:
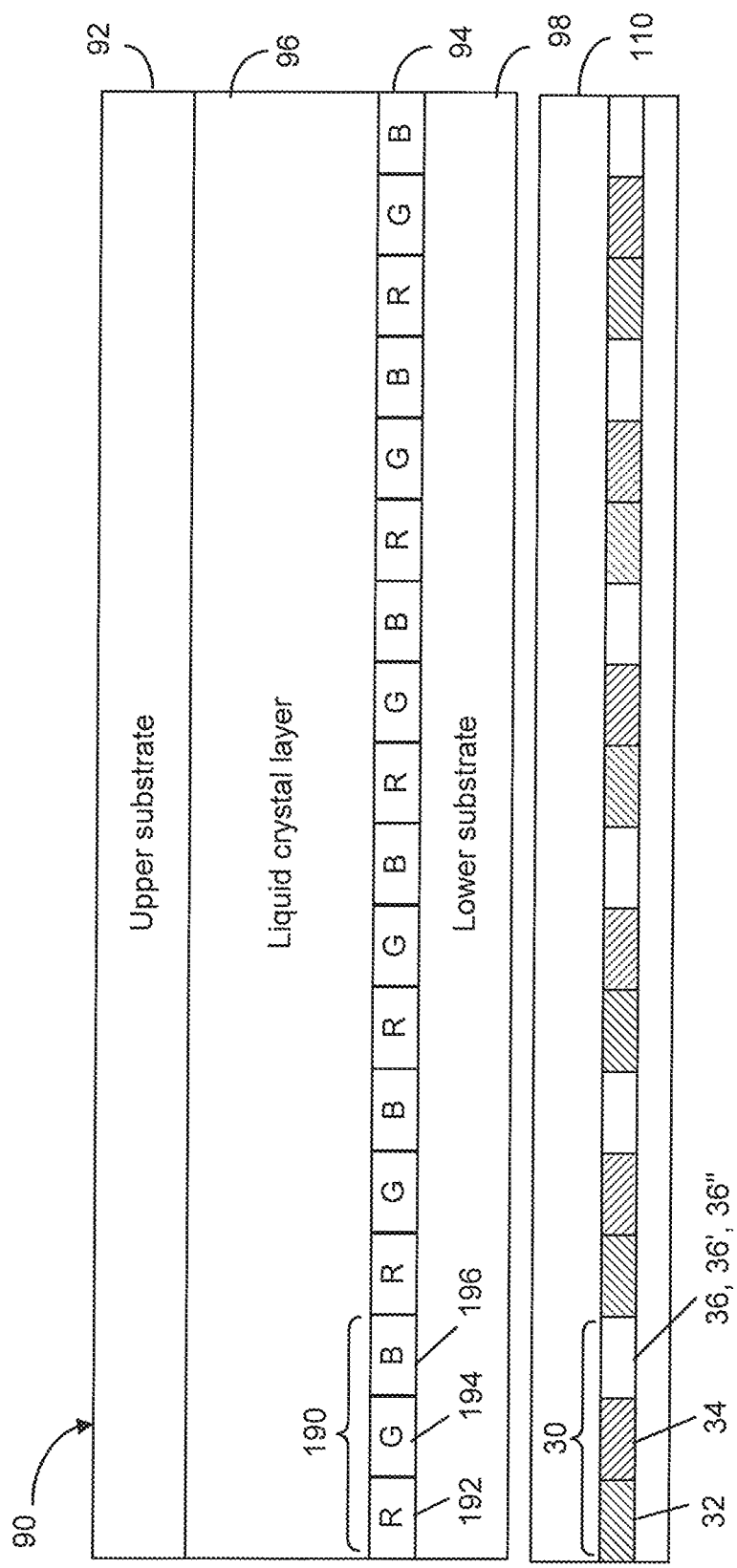
FIG. 8b illustrates a display panel, according to another embodiment of the present invention.

The present invention is directed to a quantum-dot embedded polarizer component and a color display device having such a polarizer component. According to an embodiment of the present invention, the color display device has a plurality of color pixels defined by a color filter layer and a liquid crystal display panel as shown in FIGS. 8a and 8b. The color pixels, according to an embodiment of the present invention, can be arranged in rows and columns similar to the pixels 10 in a typical display 1 as shown in FIG. 1. As shown in FIG. 1, the display device 1 has a display panel 6 on which the plurality of pixels 10 are arranged, and a data driver 4 and a gate driver 8 for providing image data and timing data to the display device 6. When the pixel 10 is a color pixel, it may have three or more color sub-pixels, such as a red pixel 22, a green pixel 24 and a blue green pixel 26, as shown in FIG. 2.

Figure 5A:
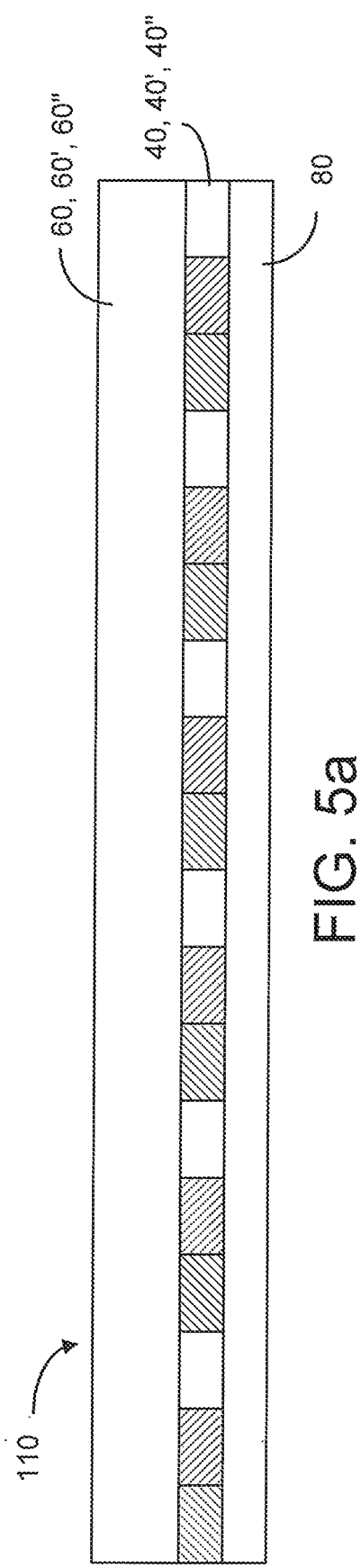
FIG. 5a illustrates a polarizer component, according to one embodiment of the present invention.
Figure 6A:
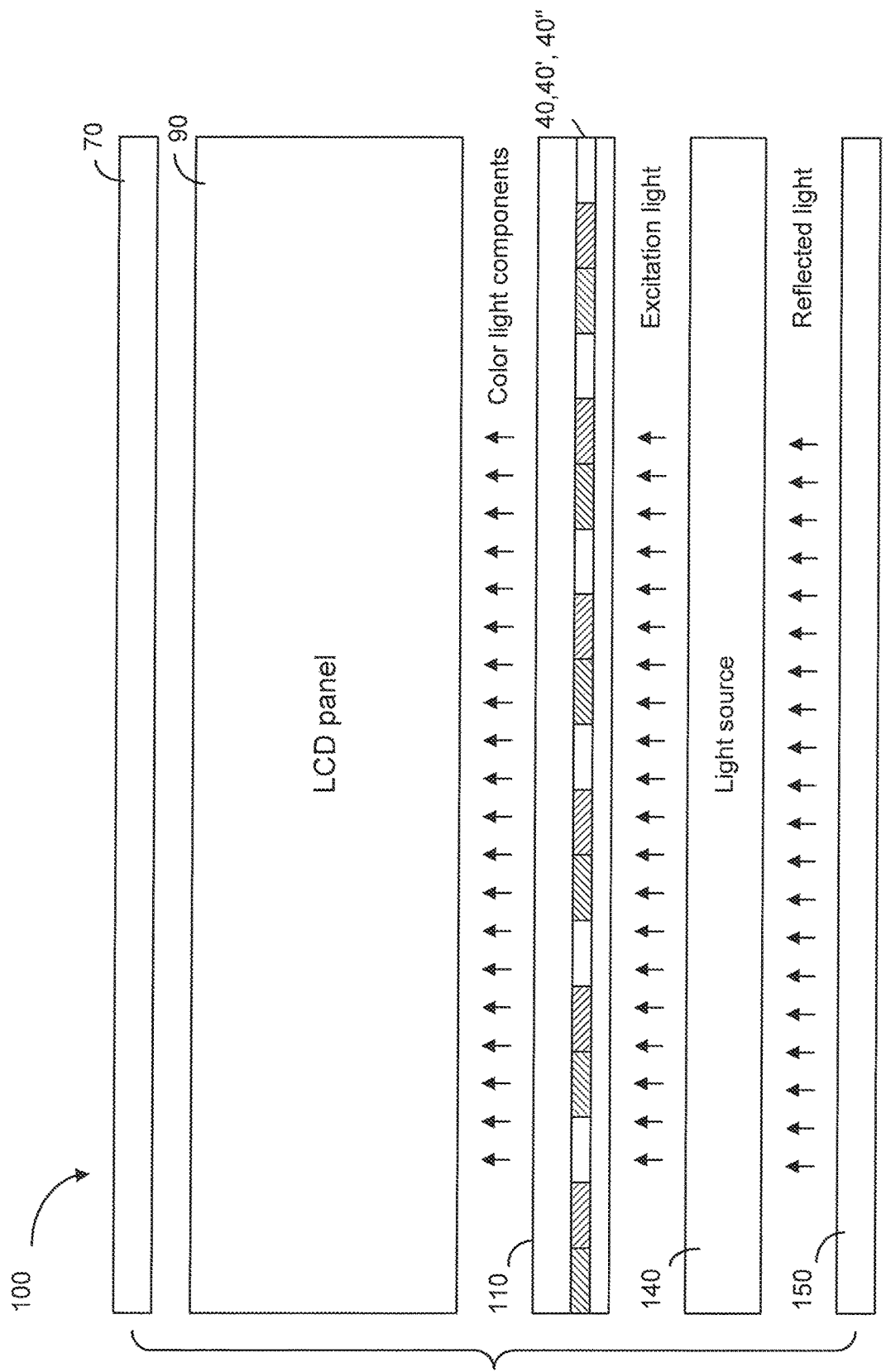
FIG. 6a illustrates a display device, according to one embodiment of the present invention.
Figure 6B:
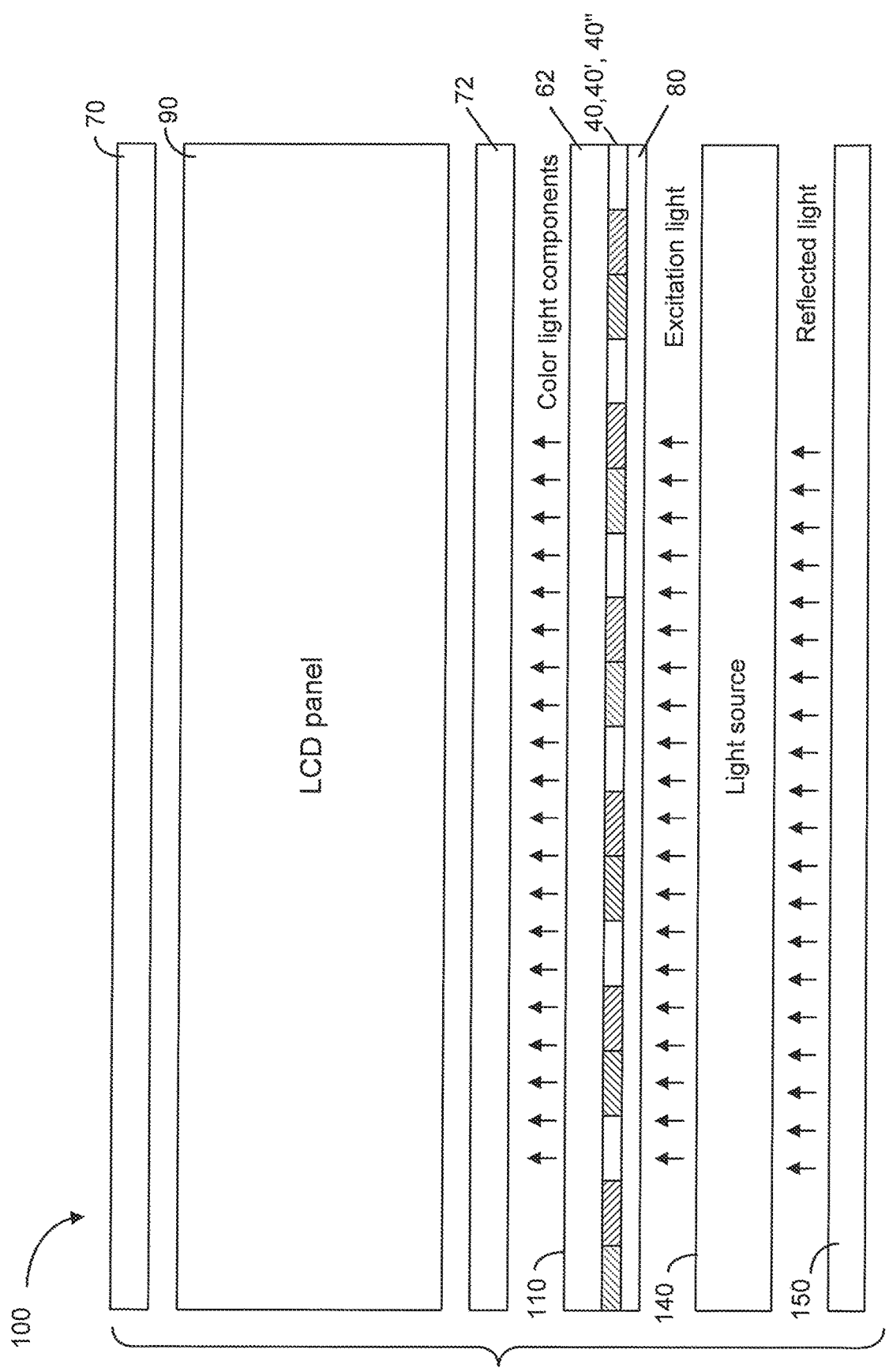
FIG. 6b illustrates a display device, according to another embodiment of the present invention.

The quantum dot embedded polarizer component, according to an embodiment of the present invention, is illustrated in FIG. 5a, and its arrangement in a color display device is shown in FIGS. 6a and 6b. As shown in FIG. 5a, the quantum dot embedded polarizer component 110 has at least three layers: a polarizing layer 60, 60' or 60", an optical film 80 and a light re-emitting layer 40, 40' or 40" disposed between the polarizing layer 60, 60' or 60" and the optical film 80. The light re-emitting layer 40, 40' or 40" has a plurality of light re-emitting cells in arranged to provide different color light components to a color pixel.

The light re-emitting cell 40, 40' or 40", as shown in FIGS. 4a, 4b, 4c, 4d, 4e and 4f comprises a first sub-cell 32, a second sub-cell 34, and a third sub-cell 36, 36' or 36". In one embodiment of the present invention as illustrated in FIGS. 4a and 4d, the first sub-cell 32 has a layer of first quantum dot material configured to emit a first light component in a red wavelength range in response to an excitation light comprising a blue wavelength range. The second sub-cell 34 has a layer of second quantum dot material configured to emit a second light component in a green wavelength range in response to the same excitation light. The third sub-cell 36 can be blank or a layer of transparent material and is arranged to transmit at least part of the excitation light received in the third sub-cell 36 for providing the third light component in the blue wavelength range. Preferably, the red wavelength range includes a peak wavelength in a range from 600 to 680 nm, the green wavelength range includes a peak wavelength in a range from 515 to 550 nm, and the blue wavelength range includes a peak wavelength in a range from 440 to 460 nm.

In a different embodiment as illustrated in FIGS. 4b and 4e, the first sub-cell 32 has a layer of first quantum dot material configured to emit a first light component in a red wavelength range in response to an excitation light comprising a blue wavelength range. The second sub-cell 34 has a layer of second quantum dot material configured to emit a second light component in a green wavelength range in response to the same excitation light. The third sub-cell 36' has a transparent material containing scattering particles configured to transmit and scatter at least part of the excitation light received in the third sub-cell 36' for providing the third light component in the blue wavelength range. Preferably, the red wavelength range includes a peak wavelength in a range from 600 to 680 nm, the green wavelength range includes a peak wavelength in a range from 515 to 550 nm, and the blue wavelength range includes a peak wavelength in a range from 440 to 460 nm.

In yet another embodiment as illustrated in FIGS. 4c and 4f, the first sub-cell 32 has a layer of first quantum dot material configured to emit a first light component in a red wavelength range in response to an excitation light comprising an ultra violet wavelength range. The second sub-cell 34 has a layer of second quantum dot material configured to emit a second light component in a green wavelength range in response to the same excitation light. The third sub-cell 36" has a layer of third quantum dot material configured to emit a third light component in a blue wavelength range in response to the same excitation light. Preferably, the red wavelength range includes a peak wavelength in a range from 600 to 680 nm, the green wavelength range includes a peak wavelength in a range from 515 to 550 nm, the blue wavelength range includes a peak wavelength in a range from 440 to 460 nm and the ultra light wavelength range includes a peak wavelength in a range from 290 to 400 nm.

Figure 5B:
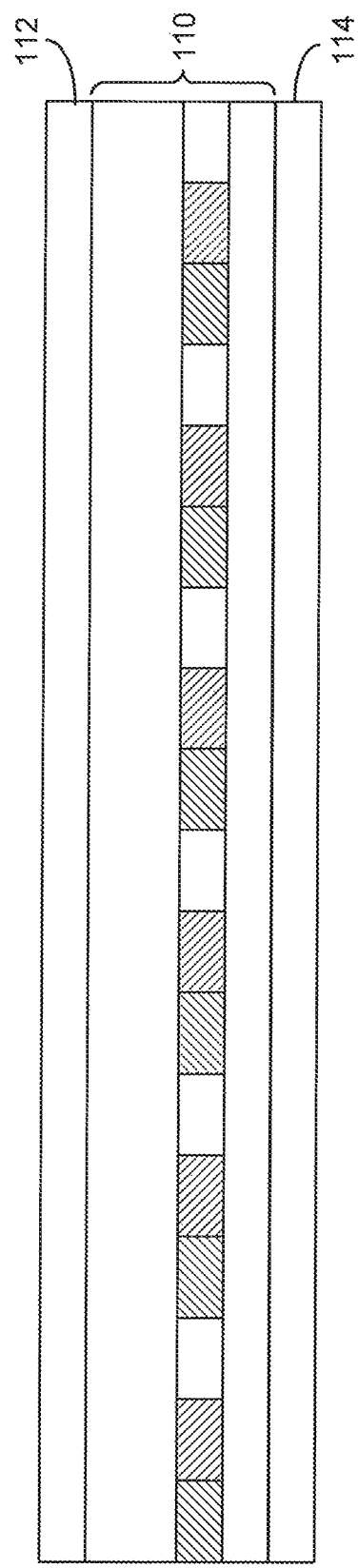
FIG. 5b illustrates a polarizer component, according to another embodiment of the present invention.

The layers 60, 60' or 60" and 80 and the layer 40, 40' or 40" in the polarizer component 110, as shown in FIGS. 5a and 5b, preferably, are fixedly attached to each other as a single optical component to be used in a color display device 100 as shown in FIGS. 6a and 6b. The mura phenomena can be erased when there is no air gap between layers 60, 60' or 60" and 80 and the layer, 40, 40' or 40". In an embodiment of the present invention, the polarizer component 110 is laminated between two protective layers 112 and 114 as shown in FIG. 5b in order to protect the quantum dot materials embedded in the polarizer component 110 from humidity, for example. The protective layers 112 and 114 can be glass substrates, for example. It should be noted that, since the polarizer component 110 is attached to the lower substrate 98 of the display panel 90 as shown in FIGS. 8a and 8b, the protective layer 112 can be omitted.

As shown in FIG. 6a, the display device has a display panel, such as a liquid crystal display panel 90 and a light source 140. The display panel 90 has a lower side and an opposing top side, and the quantum-dot embedded polarizer component 110 is disposed between the lower side of the display panel 90 and the light source 140. The light source 140 is arranged to provide the excitation light to the light re-emitting layer 40, 40', and 40" in the polarizer component 110. The display device 100 also has a top polarizer 70 disposed on the top side of the display panel 90. The light source 140 can be an edge-light type having a blue LED and a light guide panel arranged to redirect the excitation light from the blue LED, for example. The light source 140 can also be a direct-light type light source without a light guide panel. The display device 100 may have a reflecting surface 150 arranged to reflect part of excitation light through the light source toward the polarizer component 110.

Figure 7A:
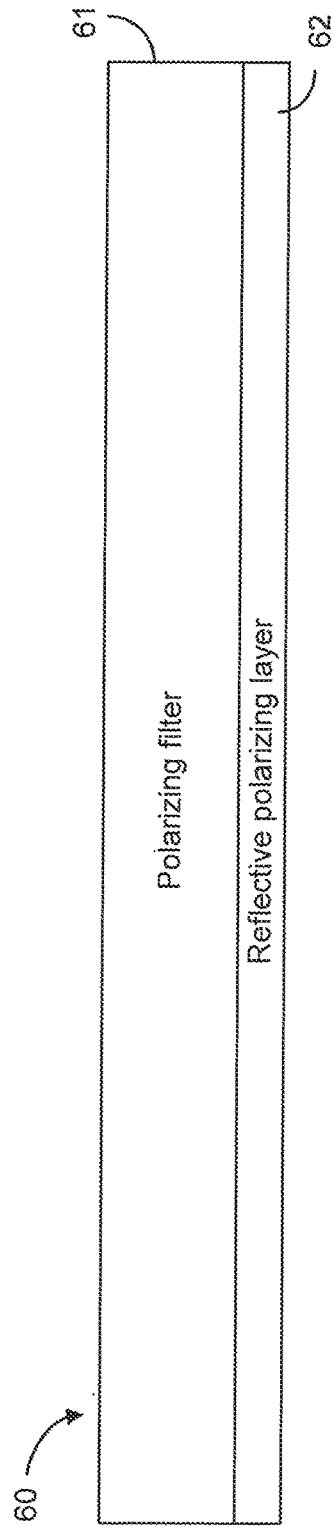
FIG. 7a illustrates a polarizing layer, according to one embodiment of the present invention.
Figure 7B:
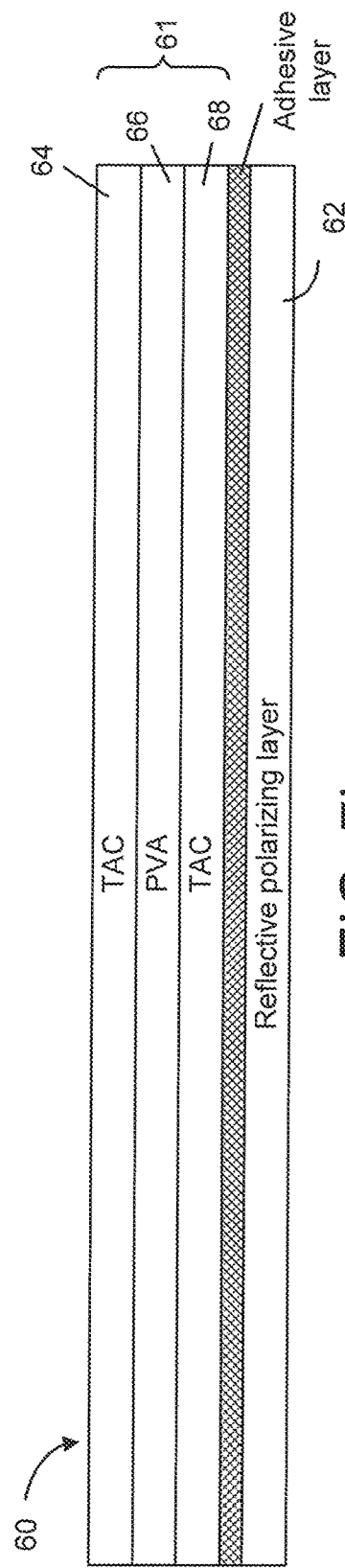
FIG. 7b illustrates a polarizing filter attached to a reflective polarizing layer to form the polarizing layer of FIG. 7a, according to an embodiment of the present invention.
Figure 7C:
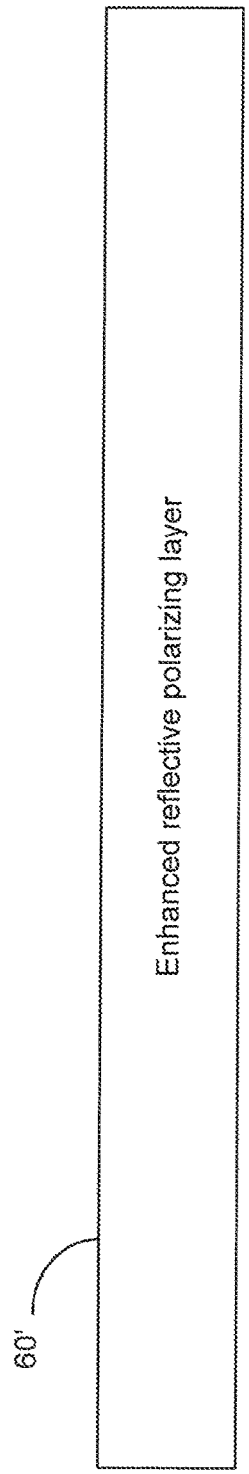
FIG. 7c illustrates a polarizing layer, according to another embodiment of the present invention.
Figure 7D:
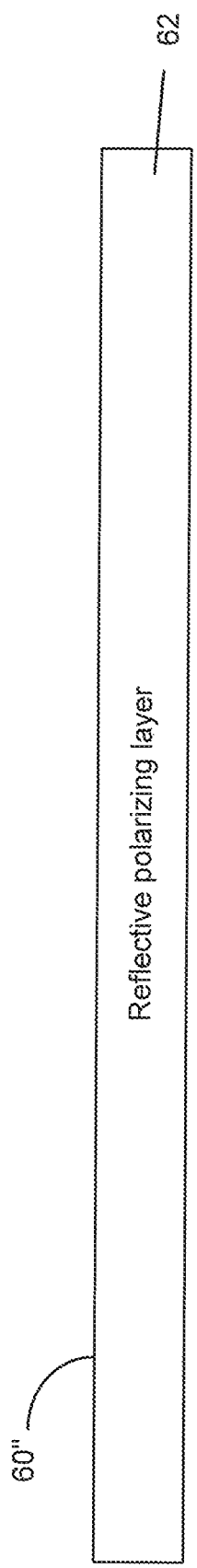
FIG. 7d illustrates a polarizing layer, according to yet another embodiment of the present invention.

The quantum-dot embedded polarizer component 110 can have different layer structures as shown in FIGS. 7a-7d. As shown in FIG. 7d, the polarizing layer 60" is a reflective polarizing layer 62. The reflective polarizing layer 62 is configured to transmit light in a first polarization direction and to reflect light in a different second polarization direction. In this arrangement, the light in the second polarization direction is recycled as the reflected light is directed toward the optical film 80 through the light re-emitting layer 40, 40' or 40".

In a different embodiment, as shown in FIG. 7a, the polarizing layer 60 has two sub-layers: a polarizing filter 61 and a reflective polarizing layer 62. The reflective polarizing layer 62 is configured to transmit light in a first polarization direction and to reflect light in a different second polarization direction. The polarizing filter 61 is configured to transmit light in one polarization direction and absorb light in another polarization direction. For example, the polarizing filter 61 can be a polarizing sheet composed of a polyvinyl alcohol (PVA) film 66 laminated between two cellulose triacetate (TAC) films 64 and 68, as shown in FIG. 7b. The PVA film 66 has been stretched in a certain direction to define its polarization axis so that the PVA film can be used to transmit light having a polarization direction parallel to the polarization axis and to block light having a polarization direction perpendicular to the polarization axis. The polarizing filter 61 can be attached to the reflective polarizing layer 62 by an adhesive layer.

In another different embodiment, the polarizing layer 60' is an enhanced reflective polarizing layer as shown in FIG. 7c. The enhanced reflective polarizing layer is configured to transmit light in a first polarization direction and to partially reflect light in a different second polarization direction and to partially absorb light in the second polarization. The enhanced reflective polarizing layer may have diffused surface (not shown) for brightness enhancement and improving brightness uniformity.

FIG. 6b is a display device, according to another embodiment of the present invention. The display device shown in FIG. 6b is similar to the embodiment of FIG. 6a. The difference is that the polarizing layer 60" in the polarizer component 110 is a reflective polarizing layer 62 and another bottom polarizer 72 is disposed between the lower side of the display panel 90 and the polarizer component 110.

The reflective polarizing layer 62, as shown in FIG. 6b, is configured to transmit light in a first polarization direction and to reflect light in a different second polarization direction. In this arrangement, the light in the second polarization direction is recycled as the reflected light is directed toward the optical film 80 through the light re-emitting layer 40, 40' or 40". Furthermore, the polarizing layer 62, the light-emitting layer 40, 40' or 40" and the optical film 80 are fixedly attached to each other to form a quantum dot embedded polarizer as a single optical component.

The optical film 80 on the polarizer component 110, as shown in FIG. 5a, can be a transparent optical film, a diffuser or a wavelength-selecting layer. In one embodiment, the wavelength-selecting layer can reflect red and green light to the light re-emitting layer 40 or 40' and transmit blue light. In this arrangement, the blue light is recycled and the reflected red and green light are redirected toward the display panel 90. In another embodiment, the wavelength-selecting layer can reflect red, green and blue light to the light re-emitting layer 40" and transmit ultra violet light. In this arrangement, the reflected red, green and blue light are redirected toward display panel 90. In yet another embodiment, the wavelength-selecting layer can reflect red and green light to the light re-emitting layer 40" and transmit ultra violet and blue light. In this arrangement, the blue light is recycled and the reflected red light and green light are redirected toward the display panel 90.

The display panel 90, as shown in FIGS. 8a and 8b, has a lower substrate 98 on the lower side and an upper substrate 92 on the top side, and a liquid crystal layer 96 disposed between the lower substrate 98 and the upper substrate 92. It is known in the art that the liquid crystal layer is controlled by electrodes and other electronic components (not shown) provided on the first and second substrates. In one embodiment of the present invention, the display device 90 has a color filter layer 94 disposed on the upper substrate 92 between the upper substrate 92 and the liquid crystal layer 96, as shown in FIG. 8a. The color filter layer 94 has a plurality of color filter segments 190. Each of the color filter segments 190 is associated with a color pixel and a light re-emitting cell 30 on the polarizer component 110. Each color filter segment 190 has a first color filter 192 arranged to filter the first light component emerged from the first sub-cell 32; a second filter 194 arranged to the filter the second light component emerged from the second sub-cell 34; and a third filter 196 arranged to filter the third light component emerged from the third sub-cell 36. The first color filter 192 can be a red color filter R, the second color filter 194 can be a green filter G and the third color filter 196 can be a blue filter B, for example.

In a different embodiment, the color filter layer 94 is disposed on the lower substrate 98 between the lower substrate 98 and the liquid crystal layer 96, as shown in FIG. 8b.

Figure 9:
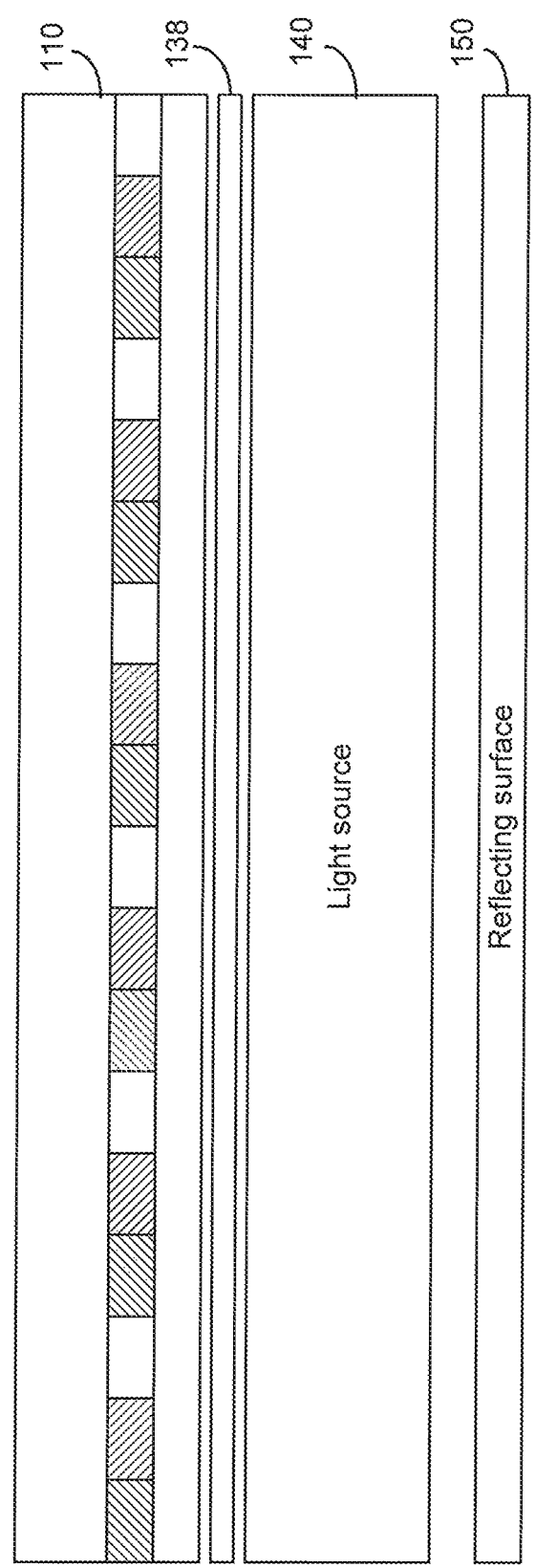
FIG. 9 illustrates the arrangement of a light source in relationship to the polarizer component, according to an embodiment of the present invention.

FIG. 9 shows the arrangement of light source 140 in relationship to the polarizer component 110. The polarizer component 110 can be directly attached or placed adjacent to the light source 140. In an embodiment of the present invention, one or more optical films 138 can be disposed between the light source 140 and the polarizer component 110, as shown in FIG. 9. One or each of the optical films 138 can be a transparent polymer film, a glass substrate such as substrate 114 as shown in FIG. 5b. The optical films 138 can also be diffusers. The reflecting surface 150 can be a reflector arranged to reflect the light from the light source 140 toward polarizer component 110.

Figure 10A:
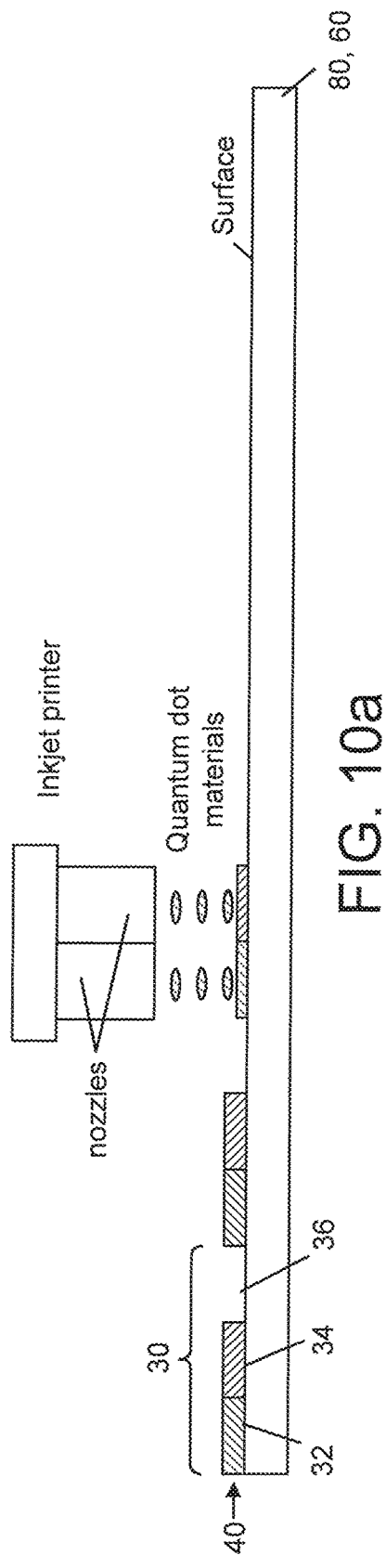
FIG. 10a illustrates a method for producing a polarizer component, according to one embodiment of the present invention.

The present invention is also directed to a method for producing the polarizer component 110. In particular, the method is concerned with producing the light re-emitting layer 40, 40' or 40" as shown in FIG. 5a. The method includes providing a surface for depositing the light re-emitting materials. According to one embodiment of the present invention, the surface can be the surface of the optical film 80 or the polarizing layer 60 (see FIG. 5a). As shown in FIG. 10a, a depositing apparatus such as an inkjet printer having two or more nozzles is used to dispense droplets containing the first light re-emitting material (first quantum dot material) and droplets containing the second light re-emitting material (second quantum dot material) onto the surface so as to form the first sub-cells 32 and the second sub-cells 34 in the light re-emitting cells 30.

The "ink" dispensed from the inkjet printer can be a mixture of solid particles of quantum dots and a clear fluid. The clear fluid can be a thermosetting adhesive, a UV-curable glue or epoxy or a combination thereof, for example. In one embodiment, the depositing apparatus have nozzles to dispense droplet containing only the clear fluid onto the surface to form the third sub-cells 36. In another embodiment, the depositing apparatus have nozzles to dispense droplet containing the clear fluid and a scattering material onto the surface to form the third sub-cells 36'. In yet another embodiment, the depositing apparatus have nozzles to dispense droplet containing the clear fluid and a third light re-emitting material (third quantum dot material) onto the surface to form the third sub-cells 36".

Figure 10B:
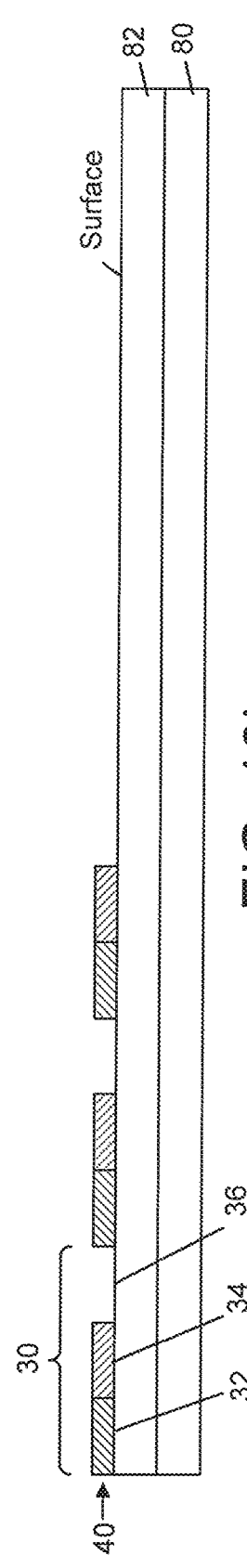
FIG. 10b illustrates a method for producing a polarizer component, according to another embodiment of the present invention.

In another embodiment of the present invention, an additional optical film 82 attached to the optical film 80 is used to provide the surface, as shown in FIG. 10b. As with the embodiment as shown in FIG. 10a, a depositing apparatus such as an inkjet printer having two or more nozzles is used to dispense droplets containing the first light re-emitting material (first quantum dot material) and droplets containing the second light re-emitting material (second quantum dot material) onto the surface so as to form the first sub-cells 32 and the second sub-cells 34 in the light re-emitting cells 30.

Figure 10C:
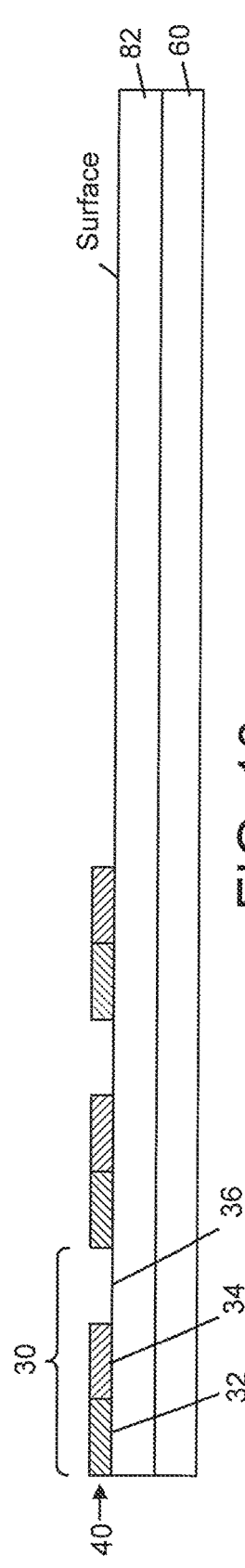
FIG. 10c illustrates a method for producing a polarizer component, according to yet another embodiment of the present invention.

Similar to the embodiment to as shown in FIG. 10b, an additional film 82 attached to the polarizing layer 60 is used to provide the surface, as shown in FIG. 10c.

In a different embodiment, the surface of the optical film 80 or the polarizing layer 60 is modified to produce a plurality of indents or pockets so that quantum dot materials can be deposited in the indents or pockets to form the sub-cells in a light re-emitting cell 30. As shown in FIG. 10d, the surface-modified film 80 or 60 has a plurality of cup-like indents. The side surfaces of each indent can be used as reflectors to redirect part of the light component in each sub-cell toward the display panel 90 (see FIG. 6) when forming on the optical film 80. A surface-modified film can be made in different ways. For example, the indents or pockets can be made by engraving, embossing or stamping. The surface-modified film can be made of PMMA, PC, PET or the like.

In a different embodiment of the present invention, the surface of the additional film 84 attached to the optical film 80 or the polarizing layer 60 is modified to produce a plurality of indents or pockets so that quantum dot materials can be deposited in the indents or pockets to form the sub-cells in a light re-emitting cell 30, as shown in FIG. 10e.

In yet another embodiment of the present invention, a third light re-emitting material (third quantum dot material) is also deposited in the third sub-cell 36" in the light re-emitting cells 30, on the cup-like indents either on the surface modified film 80, the surface modified film 60 or on the surface of the additional film 84, as shown in FIG. 10f.

In a further embodiment of the present invention, a scattering material is also deposited in the third sub-cell 36', on the cup-like indents either on the surface modified film 80, the surface modified film 60 or on the surface of the additional film 84, as shown in FIG. 10g.

Figure 3:
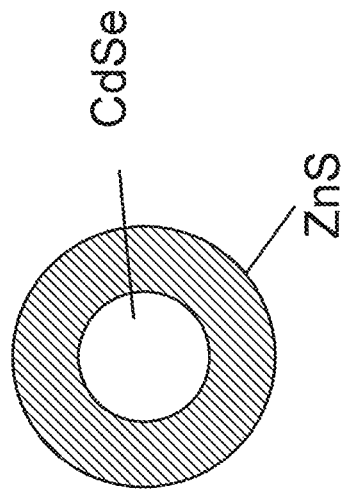
FIG. 3 is a graphical representation of a typical quantum dot.

FIG. 3 is a graphical representation of a quantum dot. As known in the art, a quantum dot is a crystal of semiconductor material whose diameter is on the order of several nanometers—a size which results in its free charge carriers experiencing quantum confinement in its spatial dimensions. A quantum dot has a core and a shell. The core can be made of CdSe, ZnSe, CdS, MnSe, InP, PbSe and CdTe, for example. The shell can be made of ZnS, ZnSe, CdS and PbS, for example. The function of the core is to provide the band gap and, thus, to control the color of the re-emitted light. The color is also controlled by the composition of the core. The shell passivates the defects on the core surface. Typically quantum dots are also provided with caps or ligand having the composition of $CH_2CH_2CH_2CH_2SH$, mainly used for dispersion in a solution.

In the quantum dot embedded polarizer component, according to the present invention, the first, second and third wavelength ranges emerged from the first, second and third quantum dot materials can be selected by controlling the size distribution and the composition of the quantum dots. The first wavelength range can be selected to match the characteristics of a red color filter, the second wavelength range can be selected to match the characteristics of a green color filter and the third wavelength range can be selected to match the characteristics of a blue color filter.

Although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A polarizer component comprising:
   a polarizing layer;
   an optical film configured to receive an excitation light; and
   a light re-emitting layer disposed between the polarizing layer and the optical film, wherein the light re-emitting layer comprises a plurality of light re-emitting cells, each cell comprising at least a first sub-cell, a second sub-cell and a third sub-cell, the first sub-cell comprising a first light re-emitting material configured to emit a first light component in a first wave-length range in response to the excitation light, the second sub-cell comprising a second light re-emitting material configured to emit a second light component in a second wave-length range in response to the excitation light, the third sub-cell configured to provide a third light component in response to the excitation light, the first re-emitting material comprising a first quantum dot material arranged to emit the first light component, the second re-emitting material comprising a second quantum dot material arranged to emit the second light component, wherein the excitation light comprises a third wavelength range, wherein the optical film and the light reemitting layer are arranged such that the excitation light is provided to the light re-emitting layer through the optical film, and wherein the optical film comprises a wavelength selecting layer configured to reflect light in the first wavelength range and light in the second wavelength range and to transmit light in the third wavelength range, wherein the polarizer layer, the light reemitting layer and the optical film are fixedly attached to each other to form a quantum dot embedded polarizer component, wherein the polarizing layer comprises a first polarizing sub-layer configured to transmit light in a first polarization and to reflect light in a second different polarization, and a second polarizing sub-layer configured to transmit light in the first polarization and to absorb light in the second polarization, and wherein the first polarizing sub-layer is provided between the second polarizing sub-layer and the light re-emitting layer.

2. The polarizer component according to claim 1, wherein the third sub-cell is configured to transmit at least part of the excitation light for providing the third light component in the third wavelength range.

3. The polarizer component according to claim 1, wherein the third sub-cell comprises a light-scattering material configured to transmit and scatter at least part of the excitation light for providing the third light component in the third wavelength range.

4. The polarizer component according to claim 1, wherein the third sub-cell comprises a third light re-emitting material, the third light re-emitting material comprising a third quantum dot material configured to emit the third light component in a fourth wavelength range in response to the excitation light, and wherein the wavelength selecting layer is further configured to reflect or transmit light in the fourth wavelength range.

5. The polarizer component according to claim 1, wherein the polarizing layer is configured to transmit light in a first polarization and to reflect light in a different second polarization.

6. The polarizer component according to claim 1, wherein the polarizing layer is configured to transmit light in a first polarization and to partially reflect light in a different second polarization and to partially absorb light in the second polarization.

7. The polarizer component according to claim 1, wherein the polarizer layer comprises a reflective polarizing layer.

8. The polarizer component according to claim 1, wherein the polarizer layer, the light reemitting layer and the optical film are fixedly attached to each other as a single optical component.

9. A method for producing a polarizer component according to claim 1, comprising:
providing a surface for the light re-emitting layer; and
depositing the first light re-emitting material in position of the first sub-cell and depositing the second light re-emitting material in position of the second sub-cell.

10. The method according to claim 9, wherein the optical film or the polarizing layer has a layer surface for providing the surface.

11. The method according to claim 9, further comprising depositing a scattering material in position of the third sub-cell.

12. The method according to claim 9, further comprising depositing a third light re-emitting material comprising a third quantum dot material in the position of the third sub-cell, the third quantum dot material configured to emit the third light component in a fourth wavelength range in response to the excitation light.

13. The method according to claim 9, wherein said depositing comprises causing one or more nozzles to dispense droplets containing the first light re-emitting material in the position of the first sub-cell and to dispense droplets containing the second light re-emitting material in the position of the second sub-cell.

14. The method according to claim 13, wherein the optical film or the polarizing layer comprises a polymer layer, said method further comprising modifying the polymer layer to provide indents thereon, the indents comprising a first indent in the position of the first sub-cells and a second indent in the position of the second subcells, the first indent arranged to receive the first light re-emitting material, and the second indent arranged to receive the second light re-emitting material.

15. A display device comprising:
a display panel having a first side and an opposing second side;
a light source; a polarizing component disposed between the first side of the display panel and the light source; and
a second polarizing component located on the second side of the display panel, wherein the polarizer component comprises:
a polarizing layer; an optical film configured to receive an excitation light and a light re-emitting layer disposed between the polarizing layer and the optical film, wherein the light re-emitting layer comprises a plurality of light re-emitting cells, each cell comprising at least a first sub-cell, a second sub-cell and a third sub-cell, the first sub-cell comprising a first light re-emitting material configured to emit a first light component in a first wave-length range in response to the excitation light, the second sub-cell comprising a second light re-emitting material configured to emit a second light component in a second wave-length range in response to the excitation light, the third sub-cell configured to provide a third light component in response to the excitation light, the first re-emitting material comprising a first quantum dot material arranged to emit the first light component, the second re-emitting material comprising a second quantum dot material arranged to emit the second light component, wherein the excitation light comprises a third wavelength range, wherein the optical film and the light reemitting layer are arranged such that the excitation light is provided to the light re-emitting layer through the optical film, and wherein the optical film comprises a wavelength selecting layer configured to reflect light in the first wavelength range and light in the second wavelength range and to transmit light in the third wavelength range, wherein the polarizer layer, the light reemitting layer and the optical film are fixedly attached to each other to form a quantum dot embedded polarizer component, and wherein the light source is arranged to provide the excitation light, said display device further comprises a third polarizing component disposed between the first side of the display panel and the polarizing component, wherein the third polarizing component is configured to transmit light in a first polarization and to absorb light in a different second polarization.

16. The display device according to claim 15, further comprising a reflective surface positioned in relationship to the light source, arranged to reflect at least part of the excitation light through the light source toward the polarizer component.

17. The display device according to claim 15, wherein the display panel comprises a first substrate on the first side, a second substrate on the second side and a liquid crystal layer disposed between the first substrate and the second substrate, wherein the polarizing layer of the polarizer component is disposed adjacent to the first substrate of the display panel, the display panel comprising a plurality of pixels, each pixel comprising at least a first color sub-pixel, a second color sub-pixel and a third color sub-pixel that are corresponding to the first, second and third sub-cells in a one-to-one fashion.

\* \* \* \* \*